(No Model.)  2 Sheets—Sheet 1.

J. E. A. BEL.
WATER METER.

No. 524,411. Patented Aug. 14, 1894.

Witnesses:
W. E. Bowen
W. C. Pinckney

Inventor
Jules E. A. Bel,
By J. E. M. Bowen,
Attorney.

(No Model.) 2 Sheets—Sheet 2.

J. E. A. BEL.
WATER METER.

No. 524,411. Patented Aug. 14, 1894.

Witnesses:
W. E. Bowen
W. C. Pinckney

Inventor:-
Jules E. A. Bel,
By J. E. W. Bowen,
Attorney.

UNITED STATES PATENT OFFICE.

JULES E. A. BEL, OF BARCELONA, SPAIN.

WATER-METER.

SPECIFICATION forming part of Letters Patent No. 524,411, dated August 14, 1894.

Application filed February 9, 1894. Serial No. 499,604. (No model.) Patented in Spain July 6, 1893, No. 14,742.

*To all whom it may concern:*

Be it known that I, JULES EUSEBE ABDON BEL, a resident of Barcelona, in the Kingdom of Spain, have invented new and useful Improvements in Water-Meters, (for which I have obtained Letters Patent of Spain, dated July 6, 1893, No. 14,742;) and I do hereby declare that the following is a full and exact description thereof, reference being made to the accompanying drawings.

My invention relates to a water-meter which is very accurate, simple and inexpensive. The construction of this water-meter is based upon the use of a membrane serving as a measuring device, which membrane is adapted to move between two hemispherical bells perforated with holes and which consequently displaces a constant volume as it passes from one bell to the other. The water which moves the membrane passes through one or the other of the perforated bells according as two pairs of pistons combined with a distributing slide valve send it through suitably arranged orifices or channels to one or the other part of the chamber wherein are contained the bells limiting the movement of the said membrane.

In order that my invention may be better understood I will proceed to describe a water meter constructed according to the same with reference to the accompanying drawings.

Figure 1:
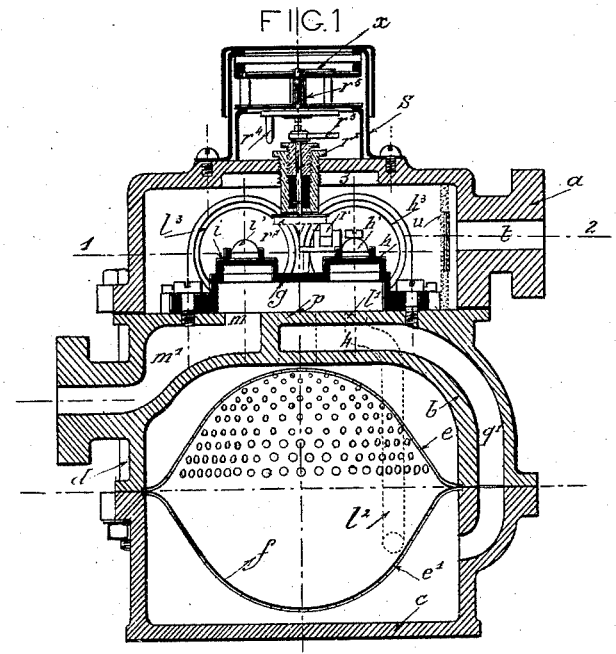
Figure 2:
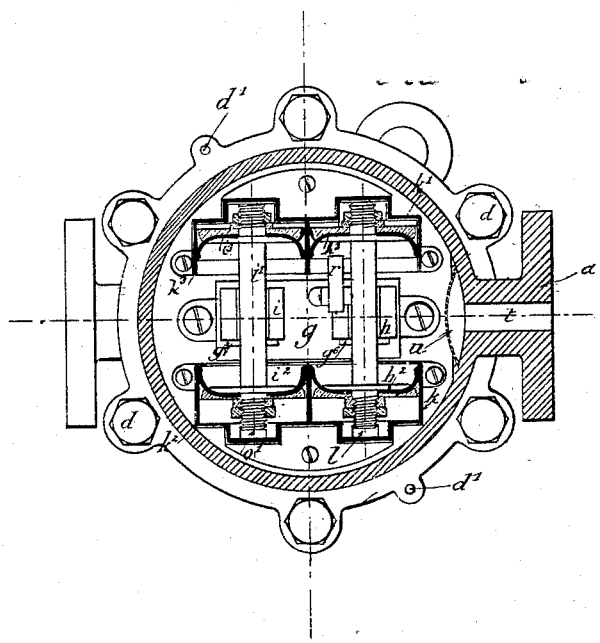
Figure 3:
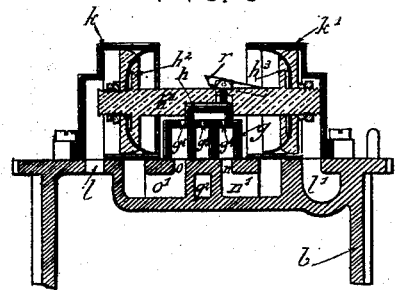
Figure 4:
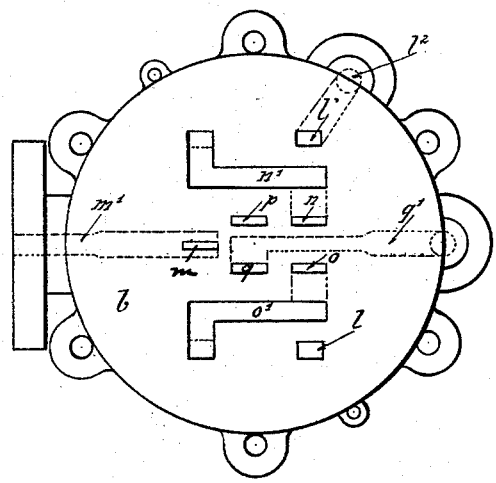
Figure 5:
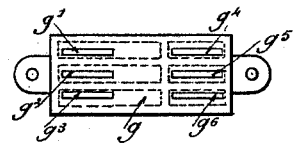

Figure 1 is a sectional elevation of my water-meter. Fig. 2 is a horizontal section taken on the line 1—2 of Fig. 1. Fig. 3 is a vertical section taken on the line 3—4 of Fig. 1. Fig. 4 is a plan of the ports. Fig. 5 is a plan of the distributing slide valve.

This improved water meter comprises three parts $a\ b\ c$ preferably made of cast iron and connected together by means of bolts $d\ d$ so as to form tight joints between them, and their relative positions are insured by pins $d'\ d'$ fixed in one of the parts $a\ b\ c$ and passing without play into corresponding holes in the opposite part. The connected parts $a\ b\ c$ form two principal compartments, that is to say, the upper compartment which is provided in the part $a$ and is reserved for the distribution of the water, and a lower compartment which is constituted by the parts $b$ and $c$ and incloses the measuring device. The latter is substantially composed of two bells constructed as hemi-spherical grates $e\ e'$ between which is held a flexible membrane $f$. The bells and membrane have their edges clamped between the parts $b$ and $c$, a tight joint being made by the edges of the membrane $f$. Upon the upper surface of the part $b$ is fixed a rectangular box $g$, which I will call a distributer, having its top pierced with two series of three rectangular orifices or ports $g'\ g^2\ g^3$ and $g^4\ g^5\ g^6$ which are precluded, by partitions cast in one piece (indicated in dotted lines) with the box $g$, from communicating with each other. Upon the top of this distributer move two box slide valves $h$ and $i$ provided on their upper surfaces with ribs by means of which they embrace the rods $h'$ and $i'$ which connect four pistons $h^2$, $h^3$, $i^2$, $i^3$, two and two being coupled together by these rods, which pistons are adapted to move in cylinders $k\ k'\ k^2\ k^3$ permanently fixed upon the upper face of the part $b$. This face of the part $b$ is pierced with orifices $l$ and $l'$. One of which, $l$, places the cylinders $k$ in communication with the upper surface of the membrane $f$, while the other orifice $l'$ places the cylinder $k'$ in communication with the lower surface of the membrane through the channel $l^2$.

The ports $g^4\ g^5\ g^6$ covered by the slide valve $h$ communicate, the one in the middle $g^5$ with the water outlet through the orifice $m$ and discharge channel $m'$; the port $g^4$ with the cylinder $k^3$ through the orifice $n$ and channel $n'$; and the port $g^6$ with the cylinder $k^2$ through the orifice $o$ and channel $o'$. On the other hand the ports $g'\ g^2\ g^3$ of the distributer $g$ covered by the slide valve $i$ communicate, the one in the middle, $g^2$, with the water outlet through the orifice $m$ and channel $m'$; the port $g'$ with the upper surface of the membrane $f$ through the orifice $p$; and the port $g^3$ with the lower surface of the same membrane $f$ through the orifice $q$ and channel $q'$. In this arrangement the pistons $h^2$ and $h^3$ and their slide valve $h$ operate the pistons $i^2$ and $i^3$ and their slide valve $i$, and these latter control the admission and discharge of the water above and below the membrane $f$. Accordingly this membrane is perfectly isolated from the distribution, no part of which is in contact with it.

Upon the rod $h'$ of the pistons $h^2$ and $h^3$ is mounted an oscillating finger $r$ which according to the direction of its movement engages with a toothed wheel $r'$, mounted upon a vertical axis $r^2$ passing through a stuffing box. On this axis is keyed a lever $r^3$ which in its movements carries away the pin $r^4$ mounted upon a disk keyed on the same axis as the pinion $r^5$ which, by its connection with toothed wheels suitably arranged in a metallic box $s$ secured on the part $a$, actuates a pointer or hand $x$ designed to indicate the outflow of water in liters, decaliters, cubic meters or the like. The part $a$ has a pipe $t$ cast in one piece with it, through which the water passes into the meter after having traversed the meshes of a wire gauze or a perforated plate $u$ which retains any materials which may be held in suspension in the water and prevents them from passing into the distributing device which they might deteriorate.

In order to explain the operation of my improved meter, I will first consider the various parts in the position which they occupy in the drawings.

The slide valve $h$ has uncovered the port $g^6$ and the slide valve $i$ the port $g^3$. Through the port $g^6$ is introduced the water which arrives in the apparatus through the pipe $t$. This water passes through the orifice $o$ and the channel $o'$ into the cylinder $k^2$ wherein it moves the piston $i^2$ causing it to occupy the position in which it is represented in Fig. 2, and causes it to uncover by the slide valve $i$ the port $g^3$ of the distributer $g$. At this movement the membrane $f$ is in its lower position in contact with the bell $e'$. The water introduced through the port $g^3$ passes through the orifice $q$ and channel $q'$ and below the membrane $f$ and raises the same until it comes in contact with the upper bell $e$, and in proportion as the water which is at its upper part flows through the orifice $p$ and the orifice $g'$ of the distributer, it passes into the interior of the slide valve $i$ in order to escape from the meter, passing through the port $g^2$ communicating with the discharge channel $m'$ through the orifice $m$. When the membrane $f$ occupies its upper position the water which is introduced into a channel $l^2$ will at this moment act upon the pistons $h^3$ as it passes through the orifice $l'$. This piston is moved and the slide valve $h$ covers the port $g^6$ again and uncovers the port $g^4$ through which the water is introduced. This water passes through the orifice $n$ and the channel $n'$ into the cylinder $k^3$ wherein it moves the piston $i^3$; the slide valve $i$ again covers the port $g^3$ and uncovers the port $g'$, the water passes into the distributer $g$ through this port $g'$ and the orifice $p$ in order to act upon the membrane $f$ which is lowered at the same time as the water which fills the space comprised between the bells $e$ and $e'$ flows out through the channel $q'$ and the orifice $q$, whence it passes into the interior of the slide valve $i$ in order to leave through the orifice $g^2$ and the channel $m'$.

When the membrane $f$ has come in contact with the lower bell $e'$ the water passing through the orifice $l$ acts only at this moment upon the piston $h^2$ which it moves. The port $g^4$ is then covered again by the slide valve $h$ and the port $g^6$ is uncovered in order to allow the passage of the water which passes through the orifice $o$ and channel $o'$ and acts upon the piston $i^2$. At this moment the pistons and the slide valves are in the positions where they were at the beginning and the phases hereinbefore explained, which are reproduced in the same order as long as water is allowed to pass into the meter. During the movement the oscillating finger $r$, in each stroke of the pistons, is caused to engage with one of the teeth of the wheel $r'$ which it turns through a certain angle, and this wheel sets in motion the indicating mechanism above set forth. To each stroke of the pistons corresponds a complete displacement of the membrane $f$ which is operated only by the discharge from the apparatus of a volume of water exactly equal to the volume comprised between the two bells $e$ and $e'$ minus that of the said membrane $f$.

It will be seen that the water acts upon the membrane $f$ and upon the two pistons $h^2 h^3$. Now as a certain pressure is needed for moving the double pistons and their slide valve $h$ while only an insignificant height of water is required for displacing the membrane, it follows that it is only when the membrane is completely forced against the bell $e$ that the pressure of the water moves the two pistons $h^2 h^3$ as above stated. The latter, carrying away their slide valve, change the admission of the water to the pistons $i^2 i^3$ and compel them to move with their slide valve, whence results the admission of the water on the other side of the membrane. In other words, the two cylinders $k k'$ being in communication through the water separated by the membrane there will be no difference of pressure between them as long as the membrane performs the part of a simple movable diaphragm, but as soon as, being applied to the bell $e$, it constitutes an obturator the equilibrium of pressure between the two cylinders is destroyed and the pistons $h^2 h^3$ are displaced with their slide valve $h$. As this slide valve controls the pistons $i^2 i^3$ and their slide valve $i$ the latter moves and reverses the direction of the admission of the water to the membrane and so on.

According as the flow of water is greater or smaller or as the membrane is mounted for moving up and down, or horizontally to and fro, I modify the arrangement and also the dimensions of the bells $e$ and $e'$ and of the other parts composing the water meter.

Having thus described my invention, what I claim as new, and desire to secure by Letters Patent, is—

1. In a water meter, in combination with its casing, a membrane, perforated bells for regulating its extreme positions, a distributer communicating with both sides of the membrane, two slide valves controlling the passage of liquid through the distributer and two pistons actuated by the pressure of the liquid and each connected with one of such slide valves, substantially as set forth.

2. In a water meter, in combination with its casing, a membrane, perforated bells for regulating its extreme positions, a distributer communicating with both sides of the membrane, two slide valves controlling the passage of liquid through the distributer, and two duplex pistons actuated by the pressure of the liquid, each slide valve being connected with a piston rod between the two members forming a duplex piston, substantially as set forth.

3. In a water meter, in combination with a membrane, perforated bells between which the membrane moves, two duplex pistons, a six-chambered distributer in communication with the interior of the casing containing the membrane and with the cylinders containing the pistons, two slide valves each connected with one of said pistons and mounted on the distributer and means for imparting motion of the pistons to a counting or registering mechanism, substantially as set forth.

4. In a water meter, in combination with its casing, a membrane, bells for regulating its extreme positions, a distributer carrying the admission ports to the chamber containing the membrane, and two duplex pistons carrying slide valves communicating with the ports of the distributer, the two pistons with their valves being adjusted so that one follows the movement of the other, substantially as set forth.

5. A water meter having juxtaposed a measuring chamber and a distributing chamber, and in which the measuring device is formed of a membrane $f$ which, being arranged in the measuring chamber between two fixed bells $e\ e'$ perforated with holes and limiting its movement, is moved by the automatic operation of double pistons $h^2\ h^3\ i^2\ i^3$ adapted to be displaced in separate cylinders $k\ k'$, $k^2\ k^3$, each of these double pistons actuating a distributing slide valve $i$ or $h$ for covering or uncovering alternately the ports of a distributing box $g$ the orifices of which are arranged in such a manner that one of the double pistons follows the movement of the other double piston and vice versa, causing the water to pass to the measuring chamber on one or the other side of the membrane, the registering mechanism being operated by an oscillating finger $r$ arranged on the rod of one of the double pistons $h^2\ h^3$ and acting upon a registering mechanism of suitable construction, the arrangement being such that the displacements of the membrane from one bell to the other effect the measuring of the water traversing the meter without the membrane having to raise or carry away any part for causing the change of motion of the double pistons and their slide valves, which change takes place automatically by the pressure of the water to be measured, substantially as hereinbefore set forth.

In witness whereof I have hereunto set my hand in presence of two witnesses.

JULES E. A. BEL.

Witnesses:
GEORGES LAURENT,
EUGÈNE WATTIR.